United States Patent
Ng et al.

(10) Patent No.: US 7,961,595 B2
(45) Date of Patent: *Jun. 14, 2011

(54) MOBILE NETWORK CONTROL APPARATUS AND MOBILE NETWORK CONTROL METHOD

(75) Inventors: Chan-Wah Ng, Singapore (SG); Pek-Yew Tan, Singapore (SG); Toyoki Ue, Yokohama (JP)

(73) Assignee: Panasonic Corporation, Osaka (JP)

( * ) Notice: Subject to any disclaimer, the term of this patent is extended or adjusted under 35 U.S.C. 154(b) by 51 days.

This patent is subject to a terminal disclaimer.

(21) Appl. No.: 12/490,223

(22) Filed: Jun. 23, 2009

(65) Prior Publication Data

US 2009/0257346 A1 Oct. 15, 2009

Related U.S. Application Data

(63) Continuation of application No. 10/539,418, filed on Jun. 17, 2005, now Pat. No. 7,567,503.

(51) Int. Cl.
*H04L 12/26* (2006.01)
(52) U.S. Cl. .................................. 370/216; 370/401
(58) Field of Classification Search .................. None
See application file for complete search history.

(56) References Cited

U.S. PATENT DOCUMENTS

| 6,167,025 A | 12/2000 | Hsing |
| 7,284,068 B1 | 10/2007 | Ramalho |
| 2001/0014917 A1 | 8/2001 | Ishiyama |
| 2002/0021689 A1 | 2/2002 | Robbins |
| 2002/0031108 A1 | 3/2002 | Inoue |
| 2002/0176414 A1 | 11/2002 | Miki |
| 2004/0090942 A1 | 5/2004 | Flinck |

FOREIGN PATENT DOCUMENTS

| JP | 10303966 | 11/1998 |
| JP | 2002 164856 | 6/2002 |
| JP | 2002 354015 | 12/2002 |

OTHER PUBLICATIONS

PCT International Search Report dated Feb. 3, 2004.
T.J. Kniveton, et al.; "Mobile Router Tunneling Protocol," Internet-Draft: draft-kniveton-mobrtr-03.txt, Nov. 1, 2002, pp. 1-17.
A. Petrescu, et al.; "Issues in Designing Mobile IPv6 Network Mobility with the MR-HA Bidirectional Tunnel (MRHA)," Internet-Draft: <draft-petrescu-nemo-mrha-00.txt>, Oct. 2002, pp. 1-27.
P. Thubert, et al.; "IPv6 Reverse Routing Header and its application to Mobile Networks," Internet-Draft: draft-thubert-nemo-reverse-routing-header-01, Oct. 11, 2002, pp. 1-37.

(Continued)

*Primary Examiner* — Chirag G Shah
*Assistant Examiner* — Daniel Mitchell
(74) *Attorney, Agent, or Firm* — Dickinson Wright PLLC

(57) ABSTRACT

A mobile network control apparatus capable of improving transmission efficiency without giving any processing loads to nodes of a mobile network. In mobile routers to which the present apparatus is applied, a tunnel failure detection unit detects a failure of packet tunneling executed using an interface of the mobile routers. A multi-homing detection unit searches for interfaces having a connection route to a global network out of an interface of the mobile routers according to the detected failure of packet tunneling. A bidirectional tunneling unit executes packet tunneling using the searched interfaces instead of the interface of the mobile routers.

7 Claims, 5 Drawing Sheets

OTHER PUBLICATIONS

T. Ernst, et al.; "Mobile Networks Support in Mobile IPv6 {Prefix Scope Binding Updates}," Internet Draft: draft-ernst-mobileip-v6-network-03.txt, Mar. 2002, pp. 1-22.

Singaporean Office Action dated Feb. 17, 2006.

C. Ng, et al., "Multihoming Issues in Network Mobility Support," NEMO Working Group Internet-Draft, Oct. 2003, p. 1-32.

E. K. Paik, et al., "Multihomed Mobile Networks Problem Statements," NEMO Working Group Internet-Draft, Oct. 2003, p. 1-5.

MOBILE NETWORK CONTROL APPARATUS AND MOBILE NETWORK CONTROL METHOD

This application is a continuation of application Ser. No. 10/539,418 filed Jun. 17, 2005, which is a national phase under 35 USC 371 of PCT/JP2003/016687 filed Dec. 25, 2003, which is based on Japanese patent application 2002/378457 filed Dec. 26, 2002, the entire contents of each of which are incorporated by reference herein.

TECHNICAL FIELD

The present invention relates to a mobile network control apparatus and a mobile network control method, and more particularly, to a mobile network control apparatus having a plurality of connection routes to a global data communication network (hereinafter referred to as "global network") and a mobile network control method therefore.

BACKGROUND ART

The Internet today has evolved into a stage at which many data communication networks (hereinafter referred to as "network") are deployed around a system of fixed network node. These peripheral networks are known as edge networks, while the fixed network node system surrounded by the edge networks is known as a core network. With the emergence and development of wireless technologies, these edge networks are further used for wireless solutions. For example, as described in "Network Mobility Support Terminology" (Ernst, T., and Lach, H., Internet Draft: draft-ernst-nemo-terminology-01.txt, October 2002, Work in Progress) and "Network Mobility Support Requirements" (Ernst, T., and Lach, H., Internet Draft: draft-ernst-nemo-requirements-00.txt, October 2002, Work in Progress), a special edge network called a "mobile network", that is, a moving network is being formed.

The mobile network is a network of a node at which the entire network changes its attachment points to the global network such as the Internet and usually requires a mobile router (device bridging the mobile network to the global network) within the mobile network between different access routers (actually, the access routers themselves may be mobile). For example, the mobile network includes a network attached to people (known as a personal area network, or PAN) and a network of sensors deployed in a vehicle such as car, train, ship or airplane. For a mass transport system such as airplane, train or bus, it is possible to provide passengers with onboard Internet access so as to connect a remote host using a laptop, personal digital assistance (PDA) or carphone. Individual nodes within such a mobile network are usually connected to a central apparatus (that is, mobile router), and when a network is in motion, the individual nodes do not change their attachment points and the mobile router changes the attachment points so that the entire network moves instead.

Therefore, the problem with the network in motion is different from the problem with conventional mobility support addressed by Mobile IPv4 (see "IP Mobility Support", Perkins, C. E. et. al., IETF RCF 2002, October 1996) in IPv4 (see "Internet Protocol", DARPA, IETF RFC 791, September 1981) and Mobile IPv6 ("Mobility Support in IPv6", Internet Draft: draft-ietf-mobileip-ipv6-18.txt, Work in Progress, June 2002) in IPv6 ("Internet Protocol Version 6 (IPv6) Specification", Deering, S., and Hinden, R., IETF RCF 2460, December 1998). A main objective of Mobile IPv4 and Mobile IPv6 is to provide mobility support to individual hosts rather than the entire network.

In a mobile IP, each mobile node has a unique home domain. When a mobile node is attached to its home network, a unique global address known as a home address is assigned to the mobile node. On the other hand, when a mobile node is away, that is, attached to some other foreign networks, a temporary global address known as a care-of-address is assigned to the mobile node. The idea of mobility support is to make it possible to reach the mobile node by referencing the home domain even when the mobile node is attached to other foreign networks. This is achieved by introducing an entity (home agent) to the home network.

The mobile node registers care-of-addresses with the home agent using a message known as "binding update." The home agent is responsible for intercepting a message addressed to the home address of the mobile node. Also, the home agent is responsible for forwarding the packet to the care-of-address of the mobile node using IP-in-IP tunneling (see "IP-in-IP Tunneling", Simpson, W., IETF RFC 1853, October 1995 and "Generic Packet Tunneling in IPv6", Conta, A., and Deering, S., IETF RFC 2473, December 1998). The IP-in-IP tunneling involves encapsulating an original IP packet with another packet. The original packet may also be called "inner packet" and the new packet which encapsulates the inner packet may also be called "outer packet."

When the concept of mobility support for individual hosts is extended to mobility support for a network of nodes, the objective of solving the problem of the mobile network is to make it possible to reach nodes within the mobile network using unique addresses no matter where on the Internet the mobile network is attached to. Several attempts have been made so far to provide a network mobility support. Most of them use a bidirectional tunnel between a mobile router and a home agent of the mobile router (see "Mobile Router Tunneling Protocol", Kniveton, T., et. al., Internet Draft: draft-kniveton-mobrtr-03.txt, Work in Progress, November 2002, "Issues in Designing Mobile IPv6 Network Mobility with the MR-HA Bidirectional Tunnel (MRHA)", Internet-Draft: draft-petrescu-nemo-mrha-00.txt, Work in Progress, October 2002, "IPv6 Reverse Routing Header and Its Application to Mobile Networks", Thubert, P., and Molteni, M., Internet Draft: draft-thubert-nemo-reverse-routing-header-01.txt, Work in Progress, October 2002, and "Mobile Networks Support in Mobile IPv6 (Prefix Scope Binding Updates)", Ernst, T., Castelluccia, C., Bellier, L., Lach, H., and Olivereau, A., Internet Draft: draft-ernst-mobileip-v6-network-03.txt, March 2002).

In a bidirectional tunnel between the mobile router and home agent, when in a home domain, the mobile router which controls the mobile network performs routing of packets on the mobile network using several routing protocols. On the other hand, when the mobile router and its network move to a foreign network, the mobile router registers the care-of-address with the home agent. Then, an IP-in-IP tunnel is set up between the mobile router and home agent. The mobile router uses the routing protocol used when it existed in the home domain on the IP-in-IP tunnel as well. This means that all packets directed to the mobile network are intercepted by the home agent and forwarded to the mobile router through the IP-in-IP tunnel. Then, the mobile router forwards the packet to a host in the mobile network. Furthermore, when the node in the mobile network wishes to send a packet to the outside of the network, the mobile router intercepts the packet, forwards the packet to the home agent through the IP-in-IP tunnel and then the home agent sends the packet to an intended recipient (packet destination set by the node within the mobile network).

However, the above described simple approach of the bidirectional tunnel cannot satisfy requirements of other powerful features (e.g., multi-homing) of IPv4 and IPv6 sufficiently. When there is a plurality of egress interfaces which offer independent routes to the global network, the mobile network can be multi-homed. When all these interfaces belong to the same router, only the router is multi-homed. The nodes of the mobile network which exist behind the router can only see one egress router and are not multi-homed. On the other hand, when these interfaces belong to different routers, the nodes of the mobile network see a plurality of egress routers and are therefore multi-homed.

The mobile network typically has wireless connection to the global network. In recent years, wireless technologies have made significant progress, but they could cause problems of instability of channels and noise, compared to wired networks. One of the advantages of multi-homing is the ability of a network node to use an alternative route to reach and be reached by the global network even when a certain uplink goes down.

However, according to the bidirectional tunnel mechanism used by the mobile router, nodes can only select one router as a default router. When this router loses its connection to the global network, the router cannot maintain the tunnel with the home agent. Moreover, a node using this router loses its connectivity to the global network even when another mobile router having an active link with the global network exists on the same network. Then, the nodes of the mobile network soon recognize that the default router has lost the route to the global network and selects an alternate mobile router as a default router.

Such a scheme depends on the nodes of the mobile network discovering routes for themselves, giving processing loads to the nodes having very limited processing capacity, e.g. embedded devices. Furthermore, there is a possibility that a delay may be produced for the nodes to recognize that the current default route has gone down. Moreover, different mobile routers broadcast prefixes of different subnets, and therefore when the mobile nodes eventually switch default routers, it is necessary to use different care-of-addresses and send a binding update to the home agent, which may further increase the delay in discovering routes.

DISCLOSURE OF INVENTION

It is an object of the present invention to provide a mobile network control apparatus and mobile network control method capable of improving the transmission efficiency without giving any processing burden to nodes of a mobile network.

The mobile network control apparatus according to an aspect of the present invention is a mobile network control apparatus, which maintains a connection that is constructed between a node belonging to a mobile network and a global network and is constructed through a router apparatus that has an interface having a connection route to the global network and belongs to the mobile network, and the mobile network control apparatus comprises: a detector section that detects a failure of packet tunneling executed using a first interface of the router apparatus; a search section that searches for a second interface of the router apparatus according to the detected failure of the packet tunneling; and an execution section that executes packet tunneling using the searched second interface instead of the first interface.

The mobile network control method according to another aspect of the present invention is a mobile network control method, which maintains a connection that is constructed between a node belonging to a mobile network and a global network and is constructed through a router apparatus that has an interface having a connection route to the global network and belongs to the mobile network, and the mobile network control method comprises: a detection step of detecting a failure of packet tunneling executed using a first interface of the router apparatus; a search step of searching for a second interface of the router apparatus according to the failure of the packet tunneling detected in the detection step; and an execution step of executing packet tunneling using the second interface searched in the search step instead of the first interface.

BEST MODE FOR CARRYING OUT THE INVENTION

Figure 1:
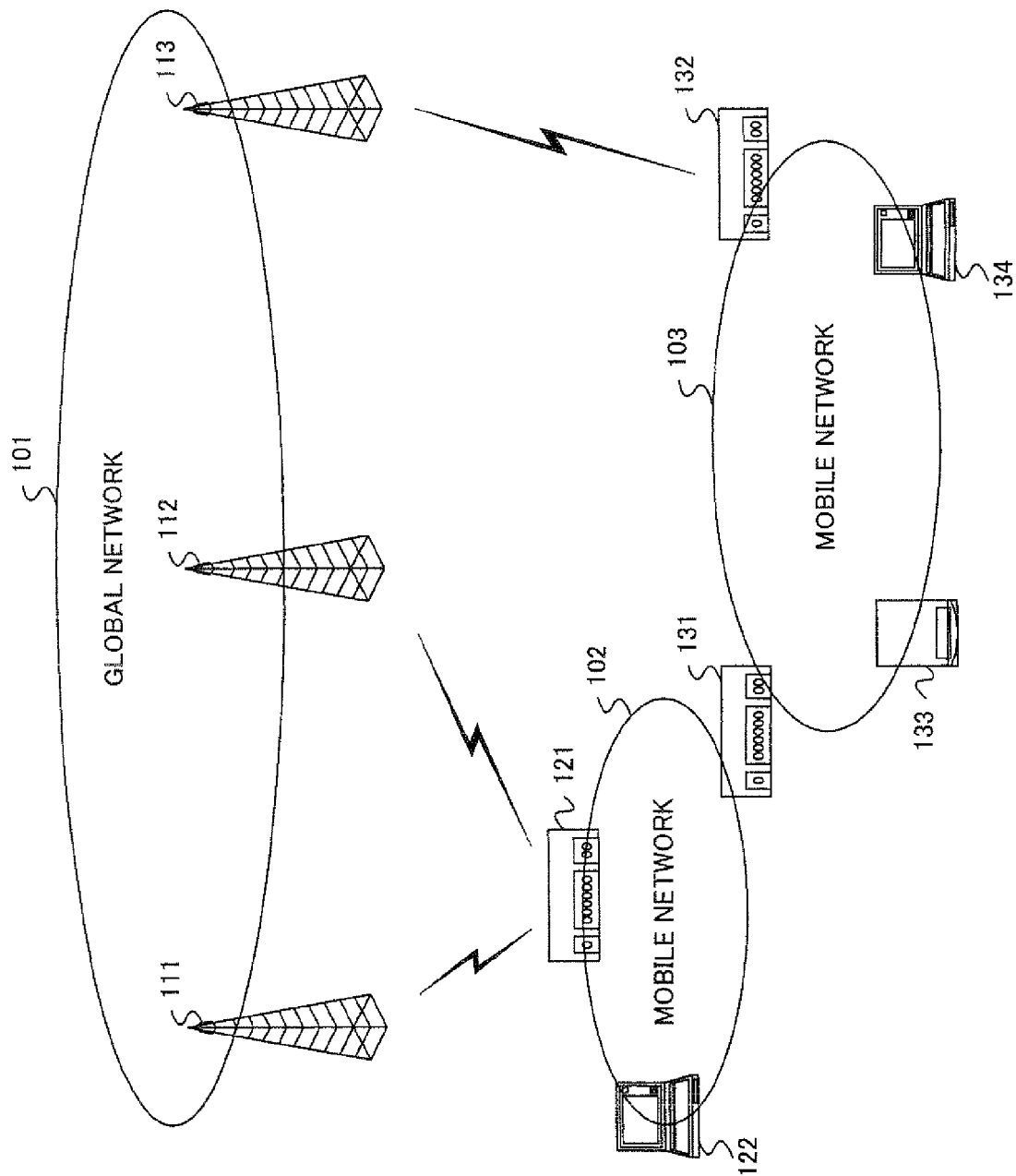
FIG. 1 is a configuration diagram of a general communication network system having mobile routers to which a mobile network control apparatus according to an embodiment of the present invention is applied.

In order to solve the above described problems, the present invention allows a mobile router to which a mobile network control apparatus is applied to use an alternative router instead. This involves the mobile router detecting the presence of another mobile router in a network segment of an ingress interface having an independent route to a global network. When an egress link of the mobile router is disconnected, the mobile router acquires a care-of-address from another mobile router, sends a binding update to a home agent and reconstructs a bidirectional tunnel which passes through another mobile router. Likewise, the mobile router having a plurality of egress interfaces can also switch between egress interfaces when maintaining the bidirectional tunnel. This eliminates the necessity of the nodes of the mobile network to change the default router. Actually, the nodes of the mobile network need not recognize the fact that the mobile router has changed the alternative route to the global network. Thus, all extra processing loads and latency associated with the nodes of the mobile network which performs default router switching and updating care-of-address bindings are eliminated, which can consequently improve the transmission efficiency.

The present invention relates to a mobile router which roams within a global network and is intended to maintain connectivity between a node connected to an ingress interface of the mobile router and its home agent through a bidirectional tunnel. The mobile router needs to inspect information passively entering the ingress interface and detect whether there are any other mobile routers which broadcast an alternative route to the global network. When such mobile routers are detected, the mobile router which has performed the detection reconstructs a bidirectional tunnel with the home agent through the above described alternative route every time the egress interface fails. Furthermore, the mobile router itself may be multi-homed. In this case, when the primary egress interface of the bidirectional tunnel fails, the mobile router is allowed to switch between the egress interfaces.

An apparatus and method for providing a roaming network (mobile network) with global connectivity will be disclosed below. To help understand the disclosed invention, the following definitions are used:

A "packet" is a self-contained unit of data having any possible format that can be delivered on a data network. The packet normally consists of two parts; a header and a payload. The payload contains data to be transmitted and the header contains information to assist transmission of the packet. The header contains a source address and destination address to identify the sender and receiver of the packet.

"Packet tunneling" refers to a self-contained type packet being encapsulated into another packet. The operation of packet tunneling is also called "packet encapsulation." Furthermore, a packet that is being encapsulated is called "tunneled packet" or "inner packet", and a packet that encapsulates the inner packet is called "tunneling packet" or "outer packet." The entire inner packet forms a payload of the outer packet.

A "default router" of a network element, refers to a router to which all packets sent by the network element without being aware of other connection routes up to a destination are delivered and which resides on the same link as the network element.

A "mobile node" is a network element which changes attachment points to the global network. For example, the "mobile node" refers to an end-user terminal, or an intermediate network element which serves as a gateway, router or intelligent network hub which can change its attachment points to the global network. The mobile node which is an enduser terminal is more specifically called a "mobile host", while the mobile node which is an intermediate network element is more specifically called a "mobile router."

A "home address" is a primary global address assigned to the mobile node and is used to enable the mobile node to be reached regardless of where on the global network the mobile node is attached to.

A mobile node which is attached to the global network at a point at which the home address has topological compatibility with an address used in the vicinity of the attachment point is said to be "at home." The vicinity of the attachment point which is controlled by a single administrative authority is called a "home domain" of the mobile node.

A mobile node which is attached to the global network at a point at which the home address has no topological compatibility with an address used in the vicinity of the attachment point is said to be "away." The vicinity of the attachment point is called a "foreign domain."

A "care-of-address" is a temporary global address assigned to a mobile node that is away and the care-of-address assigned has topological compatibility with the address used in the vicinity of the attachment point to the global network.

A "home agent" is a network entity which exists in the home domain of the mobile node, provides a service of registering the care-of-address of the mobile node when the mobile node is away so as to forward a packet directed to the home address of the mobile node to the care-of-address of the mobile node.

A "binding update" is a message sent from the mobile node to the home agent or a correspondent node and notifies the recipient (home agent or correspondent node) of the current care-of-address of the sender (mobile node). In this way, a "binding" is formed between the care-of-address of the mobile node and the home address at the recipient.

With reference now to the attached drawings, embodiments of the present invention will be explained in detail below.

In the following descriptions, specific numbers, times, structure and other parameters are used in explanations to help understand the present invention thoroughly, but it is apparent for those skilled in the art that the present invention can be implemented without such specific details.

FIG. 1 is a configuration diagram of a typical communication network system having mobile routers to which a mobile network control apparatus according to an embodiment of the present invention is applied. In the communication network system shown in FIG. 1, the operations of two multi-homed mobile networks 102, 103 connected to a global network 101 are optimized.

In FIG. 1, a mobile router 121 of the mobile network 102 has two egress interfaces connected to the global network 101 through two access points 111, 112 of the global network 101, and therefore the mobile network 102 is multi-homed. Furthermore, the mobile network 103 is also linked to the global network 101 through an egress interface linked to the mobile network 102 and also connected to the global network 101 through an egress interface connected to an access point 113 of the global network 101, and therefore the mobile network 103 is also multi-homed.

Both the mobile networks 102 and 103 are multi-homed but there is a difference therebetween. Since a mobile router 131 does not broadcast the fact that the mobile router 131 itself has a connection route (hereinafter referred to as "global connection") to the global network 101, only one default router, that is, the mobile router 121 is seen from the mobile node 122 within the mobile network 102. On the other hand, two default routers, that is, the mobile routers 131, 132 are seen from the mobile nodes 133, 134 within the mobile network 103.

As shown above, different types of multi-homed mobile networks are illustrated, and thus the present invention can be completely disclosed.

Figure 2:
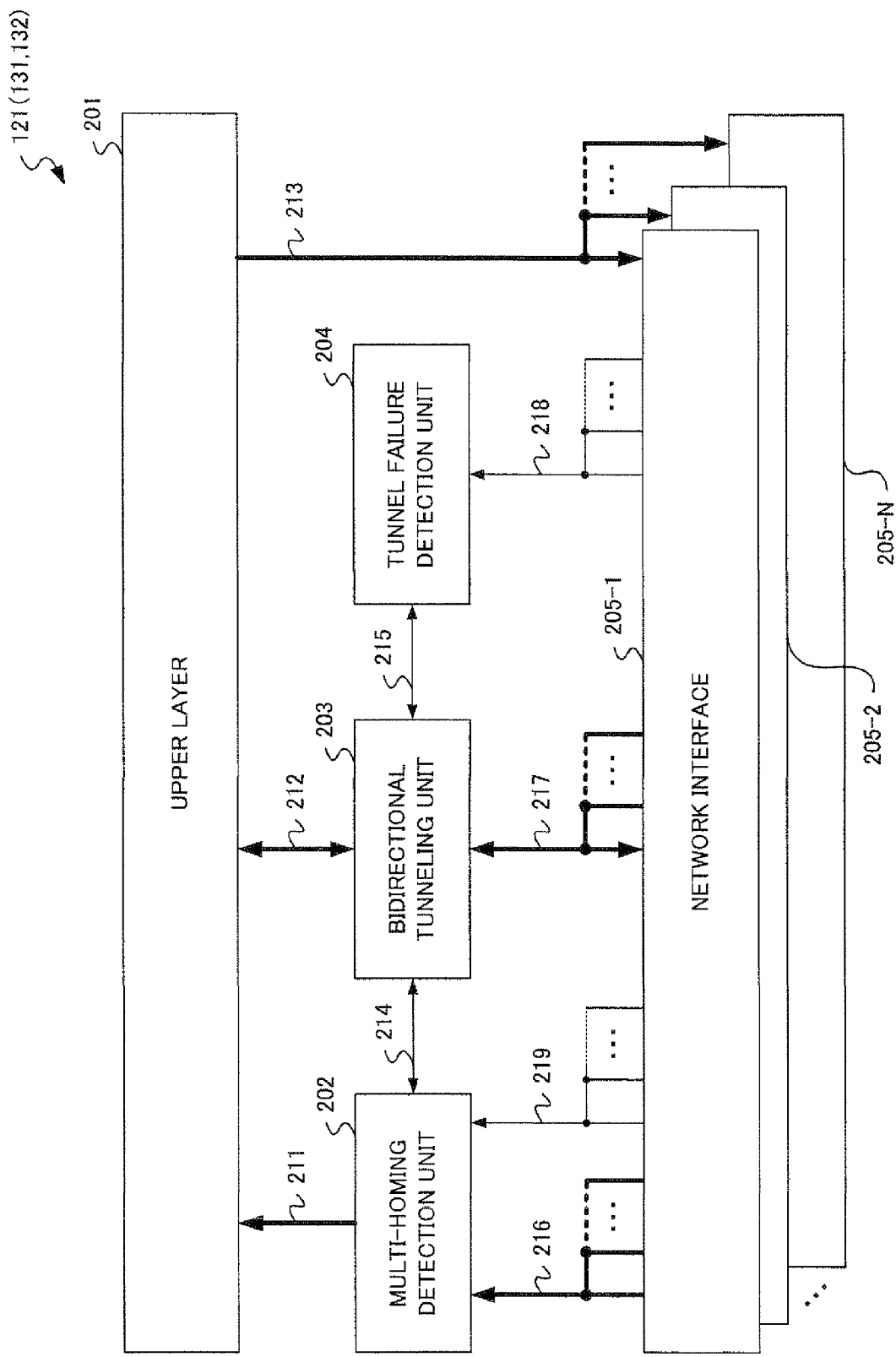
FIG. 2 is a block diagram showing the internal configuration of the mobile router.

The mobile routers 121, 131, 132 shown in FIG. 1 have similar internal configurations. FIG. 2 is a block diagram showing the internal configuration of the mobile routers 121, 131, 132.

The mobile routers 121, 131, 132 include an upper layer section 201, a multi-homing detection unit 202, a bidirectional tunneling unit 203, a tunnel failure detection unit 204 and a single or a plurality of (e.g., N) network interfaces (hereinafter referred to as "interfaces") 205-1, 205-2, ..., 205-N. Hereinafter, an arbitrary one of the interfaces 205-1 to 205-N will be simply referred to as an interface 205.

The upper layer section 201 is a block symbolizing an actual protocol stack that handles network protocols such as IPv4 and IPv6 and all protocols above these network protocols and encapsulates all protocols related to inter-terminal connections. Likewise, the interfaces 205-1 to 205-N are blocks symbolizing physical network interface cards having all necessary drivers and protocol stacks necessary to drive the physical network interface cards.

Interfaces (e.g., interfaces 205-1 to 205-N) generally include one or more interfaces used as egress interfaces and one or more interfaces used as ingress interfaces. The ingress interface is connected to network elements (e.g., mobile nodes 122, 133, 134) on local networks (e.g., mobile networks 102, 103) and the egress interface is connected to a global network (e.g., global network 101).

Here, the intermediate functionality inserted between the network protocol layer and network interface layer (that is, functionalities of the multi-homing detection unit 202, bidirectional tunneling unit 203 and tunnel failure detection unit 204) will be explained in detail.

The multi-homing detection unit 202 detects whether another router that broadcasts the availability of a route to the global network exists on the same link as one of the ingress links. This detection is realized by inspecting all packets entering from the interface 205 through a packet flow path 216. These packets are handed over to the upper layer section 201 to be subjected to normal processing through a packet flow path 211. Furthermore, the multi-homing detection unit 202 can also detect whether the mobile routers 121, 131, 132 themselves are multi-homed or not by deciding whether a plurality of active egress interfaces exists in the interfaces 205-1 to 205-N through a signal flow path 219.

The bidirectional tunneling unit 203 carries out bidirectional packet tunneling for incoming packets and outgoing packets. All packets sent from a packet flow path 212 are encapsulated and forwarded to the home agent. The upper layer section 201 is expected to only switch between outgoing packets directed to the global network 101 via the packet flow path 212. For a packet that is destined to one of the ingress links, the upper layer section 201 can also directly switch between packets to an appropriate interface 205 using a packet flow path 213. After encapsulation, the outgoing packet will be routed to the appropriate interface 205 to be sent out.

The bidirectional tunneling unit 203 decapsulates an incoming packet which has been encapsulated in a tunnel. The decapsulated packet is handed over to the upper layer section 201 via the packet flow path 212 for normal processing.

The tunnel failure detection unit 204 detects disconnection of a link through which the bidirectional tunneling goes, that is, the failure of bidirectional packet tunneling through a signal flow path 218. Tunnel failures can occur when the home agent has no capacity to receive any tunnel packets. Such tunnel failure occurs may be indicated by the interface 205 or by a consistent rejection of packets by an intermediate router. Generally, most wired or wireless interfaces including the interface 205 provide a system call to query the link status of a physical channel. The tunnel failure detection unit 204 can detect the disconnection of the link through such a system call.

Furthermore, when an intermediate network node cannot forward a packet to the next (intermediate) destination for some reason, most network protocols provide means for feedback to notify the sender of this failure. Again, the tunnel failure detection unit 204 captures such notification, and determines that the tunnel has failed after consistently receiving such notification for an extended period of time. When the failure is detected, this becomes a trigger and the bidirectional tunneling unit 203 takes appropriate action using the signal flow path 215.

The applicability of the present invention greatly depends on the detection/discovery of another router having an alternative route to the global network 101 (hereinafter the router having an alternative route to the global network 101 will be referred to as "alternative router"). Therefore, the multi-homing detection unit 202 plays a very important role here. In order to detect the presence of other alternative routers, the multi-homing detection unit 202 inspects all incoming packets and detects packets including an advertisement message sent from other routers.

According to most network protocols used in a packet-switched network, the router periodically (for example) broadcasts an advertisement message including information on the router to all nodes on the same link. From these messages, the recipient node can know whether the router has a path to the global network or not. For example, in IPv6 neighbor discovery described in "Neighbor Discovery for IP Version 6" (Narten, T., Nordmark, E., and Simpson, W., IETF RFC 2461, December 1998), when the router sends an advertisement message to a node on the ingress link, the router sets a router lifetime field to a non-zero value and then sends the advertisement message. Thus, for the broadcasted lifetime, it is possible to indicate that the router is available as a default router (that is, a router having a connection route to the global network). Therefore, when the multi-homing detection unit 202 on the mobile router 121, 131, 132 is implemented in an IPv6 environment, it is possible to detect the presence of other alternative routers using this. Once an alternative router is detected, the alternative router can be added to a list of alternative routers stored by the multi-homing detection unit 202.

Furthermore, the mobile router 121, 131, 132 also has a possibility of having a plurality of active egress interfaces simultaneously, in other words, a possibility that the mobile router itself is multi-homed. This is detected by the multi-homing detection unit 202. However, this presupposes that one of the egress interfaces is a primary egress interface used by all packets sent from the local network. Furthermore, the egress interface is also a normal egress interface through which a bidirectional tunnel passes.

In this case, other active egress interfaces are classified as alternative egress interfaces and stored in a list of alternative egress interfaces stored by the multi-homing detection unit 202. Furthermore, the multi-homing detection unit 202 monitors the interfaces 205-1 to 205-N continuously, and therefore when an egress interface which is no more active is detected, it is also possible to remove such an egress interface from the list of alternative egress interfaces.

Next, the operation of the mobile router 121, 131, 132 will be explained. The present invention will be generalized by describing a case where an egress interface goes down in a mobile router (e.g., mobile router 132) which is not multi-homed in the first part of the following disclosure and a case where an egress interface goes down in a multi-homed mobile router (e.g., mobile router 121) in the later part of the disclosure.

Under normal operation, the bidirectional tunneling unit 203 uses a primary egress interface for transmitting a tunnel packet. When the tunnel failure detection unit 204 detects failures of tunneling which passes through the primary egress interface, the tunnel failure detection unit 204 has to construct an alternative connection route for packet tunneling. In the following explanations, suppose the interface 205-1 is the egress interface used for the failed tunneling.

First, the operation of the mobile router 132 which is not multi-homed will be explained with reference to FIG. 3.

After the tunnel failure detection unit 204 detects the failure of the bidirectional tunneling using the interface 205-1 (S1010), the multi-homing detection unit 202 conducts a check to acquire a router in the list of alternative routers and thereby decides the presence/absence of a router for global connection (S1020). When the result of this decision shows that the router having global connection is included in the list of alternative routers (S1020: YES), the multi-homing detection unit 202 selects the router in the list and moves to step S1030. When no router having global connection exists, that is, the list of alternative routers is empty (S1020: NO), the mobile router 132 has to enter a disconnected state (S1040). In the disconnected state, the mobile router 132 may have to discard all packets to be forwarded to the global network 101 and passively wait for the egress link to be restored, and therefore the process moves to step S1110.

In step S1030, it is decided whether the care-of-address need be acquired from the selected router or not. For example, when the current address of the ingress interface for the link in which the selected router exists, in other words, the ingress interface having a connection route to the selected router (referred to as "interface 205-A" in this embodiment) is not a valid global address (e.g., when the current address is a private address), the care-of-address needs to be acquired (assigned) from the selected router (S1030: YES), and therefore the care-of-address is acquired from the selected router (S1050). On the other hand, when the current address is a valid global address, the care-of-address need not be acquired from the selected router (S1030: NO), and therefore the process skips steps S1050, S1060 and moves to step S1070.

When the multi-homing detection unit 202 discovers a new alternative router, it may also immediately acquire the care-of-address from the alternative router. In this case, the discovered care-of-address of the alternative router is stored in the list of alternative routers together with the alternative router entry. By so doing, it is possible to eliminate the necessity for acquiring the care-of-address in step S1050 after selecting the router in step S1020.

Then, in step S1060, it is decided whether the acquisition of the care-of-address in step S1050 has been successful or not. When the acquisition of the care-of-address is successful (S1060; YES), the process moves to step S1070, whereas when the acquisition of the care-of-address is not successful (S1060: NO), the process moves to step S1100.

In step S1070, a binding update is sent to the home agent through the selected router. This binding update is sent so that the mobile router 132 notifies the home agent that the start address of the bidirectional tunnel is changed to the address of the interface 205-A. Then, the system waits for reception of an acknowledgement (ACK) of transmission of the binding update.

In step S1080, it is decided whether the ACK has been received or not. When the ACK has been received (S1080: YES), this means that a bidirectional tunnel with the home agent has been newly constructed as a provisional measure. Then, the process moves to step S1090. On the other hand, when a timeout results while the system is waiting for reception of the ACK or when a negative acknowledgement (NACK) is received (S1080: NO), the process moves to step S1100.

In step S1090, the bidirectional tunneling unit 203 enables the interface 205-A to be used as an interface which becomes the starting point (end point) of a bidirectional tunnel and also enables the global address (care-of-address) associated with the link to the router selected from the interface 205-A to be used as a new temporary source address (destination address) of the bidirectional tunnel. Then, bidirectional tunneling using the interface 205-A is performed. The process then moves to step S1110.

In step S1100, the selected router is removed from the list. Since the selected router is removed from the list in this way, it is possible to carry out maintenance of the list of alternative routers and more efficiently perform similar alternative route search operations which will be executed later. After executing step S1100, the process returns to step S1020.

In step S1110, the tunnel failure detection unit 204 monitors the disconnected link, that is, the link between the interface 205-1 and global network 101. The tunnel failure detection unit 204 continues the monitoring until this link is restored and when this link is restored, the process moves to step S1120. In step S1120, the bidirectional tunnel constructed as the provisional measure is canceled and bidirectional tunneling using the interface 205-1 is restarted.

Figure 3:
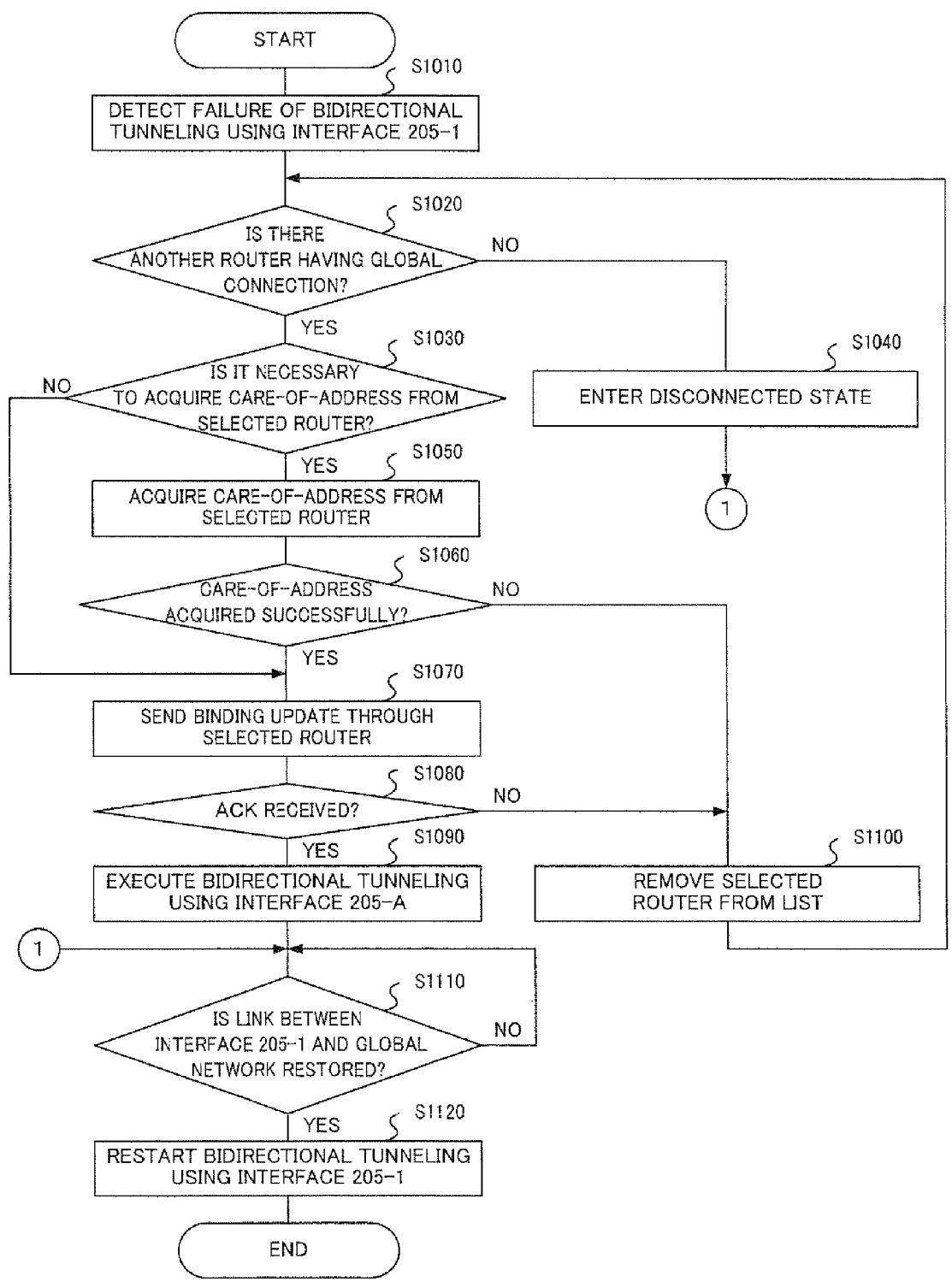
FIG. 3 is a flow chart illustrating an operation example of the mobile router.

Though not shown in FIG. 3, the tunnel failure detection unit 204 also monitors failures of the bidirectional tunneling newly constructed as the provisional measure. When a failure of this bidirectional tunneling is detected, it is obvious that an operation similar to that shown in FIG. 3 is executed.

Furthermore, when the home agent approves that the mobile router 132 registers a plurality of care-of-addresses simultaneously, it is also possible to further optimize the above described operation. More specifically, every time the multi-honing detection unit 202 discovers a new alternative router and acquires a care-of-address from this alternative router, the multi-homing detection unit 202 immediately sends a binding update for registering the acquired care-of-address as an alternative care-of-address to the home agent. In this case, it is not necessary to request a care-of-address or send a binding update after the router is selected. Therefore, it is possible to simplify processing during a period from the time the construction of bidirectional tunneling becomes necessary as a provisional measure to the time the bidirectional tunneling is actually constructed. Also, it is possible to shorten the required time.

Next, the operation of the multi-homed mobile router 121 will be explained with reference to FIG. 4A and FIG. 4B.

After the tunnel failure detection unit 204 detects a failure of the bidirectional tunneling using the interface 205-1 (S1010), the multi-homing detection unit 202 conducts a check to acquire an egress interface in the list of alternative egress interfaces and thereby decides the presence/absence of an active egress interface (S1011). When the result of this decision shows that an active egress interface is included in the list of alternative egress interfaces (S1011: YES), the multi-homing detection unit 202 selects the egress interface (hereinafter referred to as "interface 205-B") in the list and moves to step S1012. When no active egress interface exists, that is, the list of alternative egress interfaces is empty (S1011: NO), the process moves to step S1020. That is, when the list of alternative egress interfaces is empty, the mobile router 121 continues executing an operation similar to the above described operation of the mobile router 132 (S1020 to S1120).

In step S1012, a binding update is sent to the home agent through the selected interface 205-B. This binding update is sent so that the mobile router 121 connects the start address of the bidirectional tunnel to the address (care-of-address) of the interface 205-B. Then, the system waits for reception of an acknowledgement (ACK) of transmission of the binding update.

Then, in step S1013, it is decided whether an ACK has been received or not. When the ACK has been received (S1013: YES), this means that the bidirectional tunnel with the home agent has been newly constructed as a provisional measure. Then, the process moves to step S1014. On the other hand, when a timeout results while the system is waiting for reception of the ACK or when a negative acknowledgement (NACK) is received (S1013: NO), the process moves to step S1015.

In step S1015, the selected interface 205-B is removed from the list. Thus, since the selected egress interface is removed from the list, it is possible to perform maintenance of the list of alternative egress interfaces and more efficiently perform a similar alternative route search operation that will be executed later. After executing step S1015, the process returns to step S1011.

On the other hand, in step S1014, the bidirectional tunneling unit 203 enables the interface 205-B to be used for a provisional bidirectional tunnel and executes bidirectional tunneling using the interface 205-B. Then, the process moves to step S1016.

In step S1016, the tunnel failure detection unit 204 monitors the disconnected link, that is, the link between the interface 205-1 and global network 101. Then, the tunnel failure detection unit 204 continues the monitoring until this link is restored and when this link is restored, the process moves to step S1017. In step S1017, the bidirectional tunnel constructed as a provisional measure is canceled and bidirectional tunneling using the interface 205-1 is restarted.

Figure 4A:
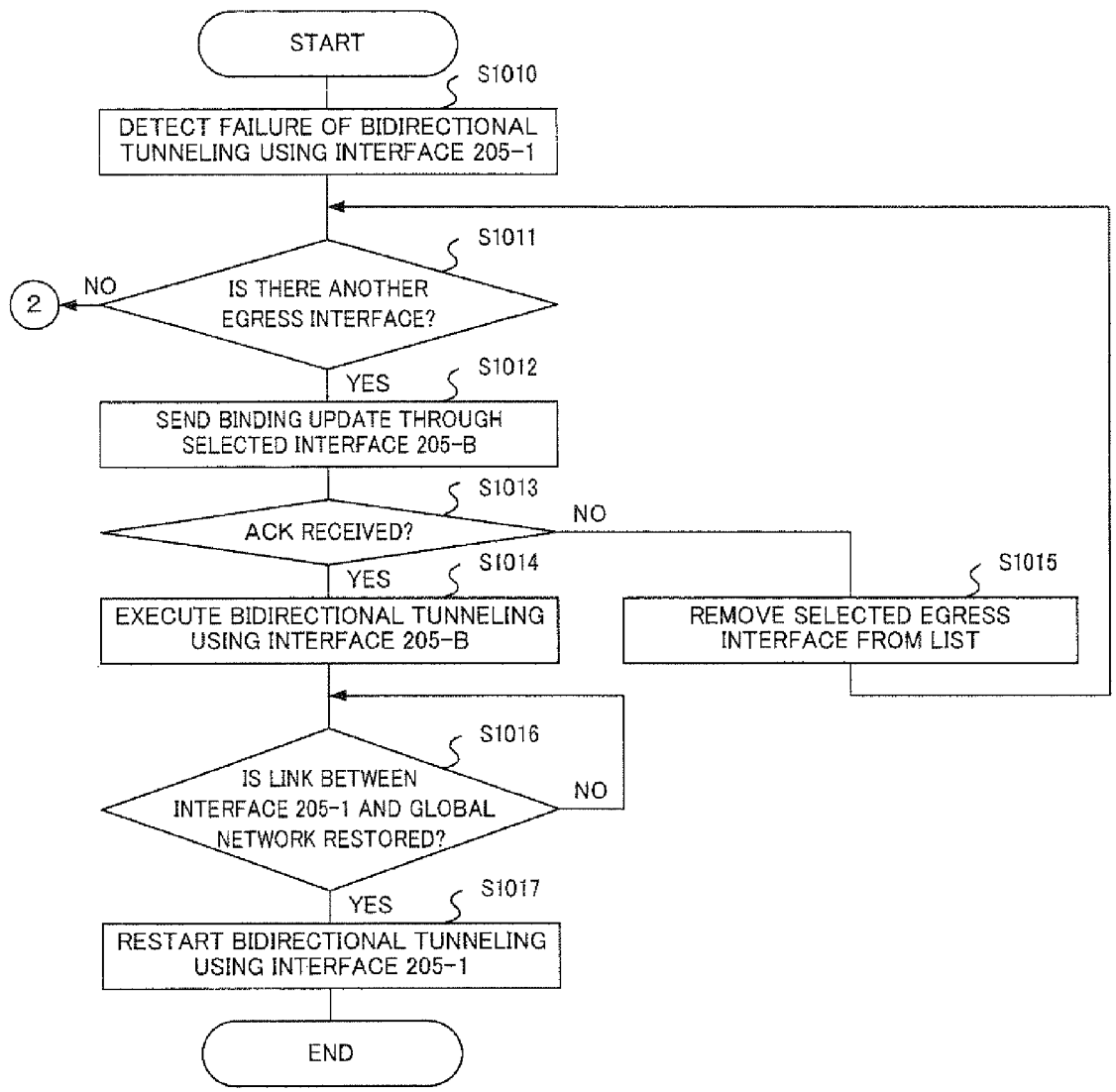
FIG. 4A is a flow chart illustrating another operation example of the mobile router.
Figure 4B:
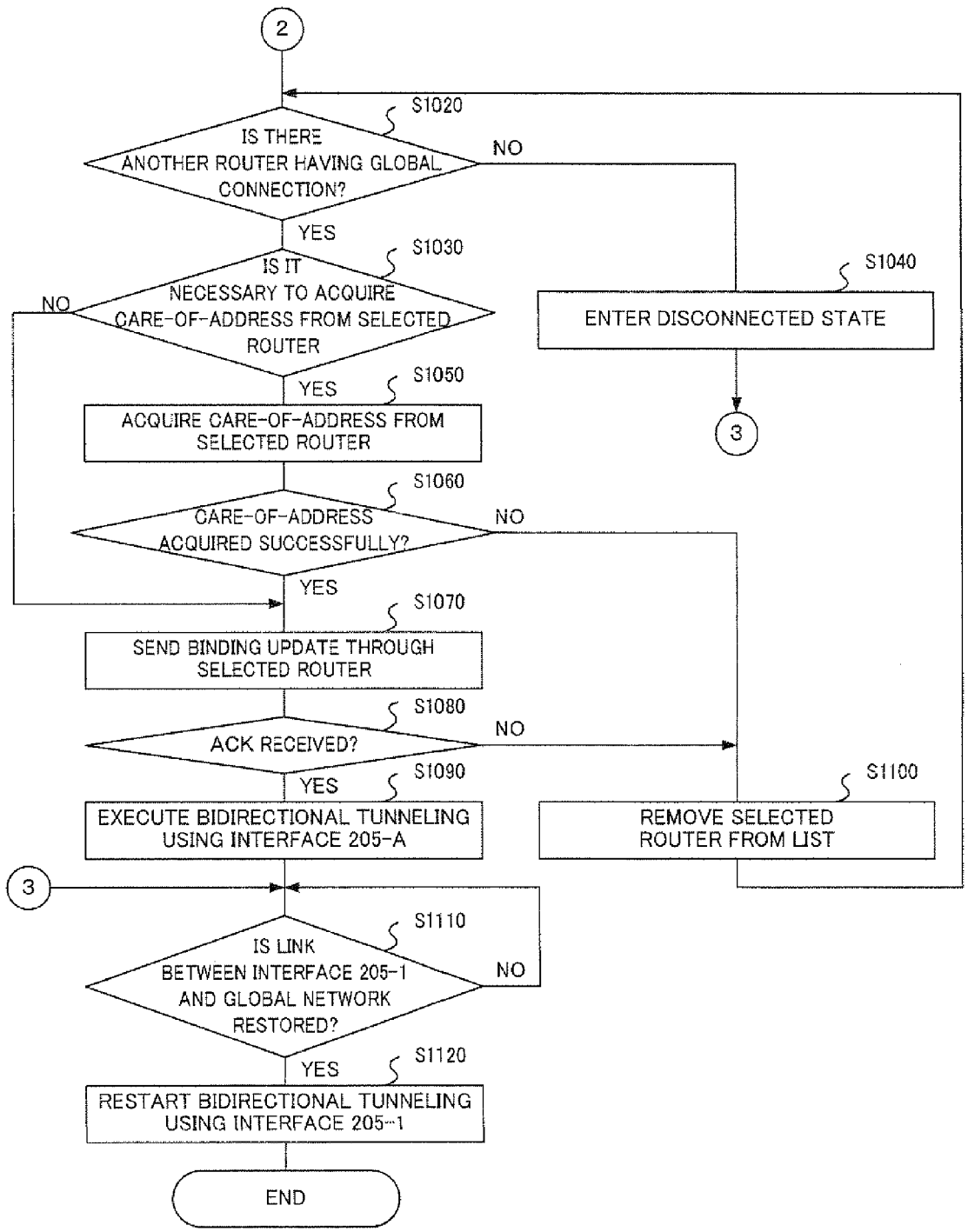
FIG. 4B is a flow chart illustrating the continuation of the operation example shown in FIG. 4A.

Though not shown in FIG. 4A and FIG. 4B, the tunnel failure detection unit 204 also monitors failures of the bidirectional tunneling newly constructed as the provisional measure. When a failure of bidirectional tunneling is detected, it is obvious that operations similar to those shown in FIG. 4A and FIG. 4B are executed.

Furthermore, when the home agent approves that the mobile router 121 registers a plurality of care-of-addresses simultaneously, the above described operation can be further optimized. More specifically, every time the multi-homing detection unit 202 discovers a new alternative egress interface, it immediately sends a binding update for registering the care-of-address as an alternative care-of-address to the home agent. In such a case, it is not necessary to request a care-of-address or send a binding update after the egress interface is selected. Therefore, it is possible to simplify processing during a period from the time the construction of bidirectional tunneling becomes necessary as a provisional measure to the time the bidirectional tunneling is actually constructed. Also, it is possible to shorten the required time.

The above described explanation of the mobile router 121 provided with a plurality of egress interfaces presupposes that the mobile router 121 includes only a single bidirectional tunnel and uses only one of the plurality of egress interfaces as a primary egress interface. However, by providing the multi-homing detection unit 202, bidirectional tunneling unit 203 and tunnel failure detection unit 204 to the respective egress interfaces used as the primary egress interfaces for the bidirectional tunnel, it is possible to eliminate the above described presupposition and extend the present invention. In this case, the operation shown in FIG. 3 and the operations shown in FIG. 4A and FIG. 4B can be executed by the respective bidirectional tunnels. Especially, the multi-homing detection unit 202 related to a certain one bidirectional tunnel treats primary egress interfaces of the other bidirectional tunnels as alternate egress interfaces. Then, to compensate for the failure of bidirectional tunneling as required, it is possible to use the other primary egress interfaces.

Thus, according to this embodiment, it is possible for the mobile router using bidirectional tunneling with the home agent to efficiently use the multi-homing technology used in the network protocol and minimize adverse effects caused by the failure of the egress link. Using the present invention disclosed here, the mobile router can actively search for an alternative route to reconstruct a bidirectional tunnel with the home agent, thereby eliminate the necessity for each mobile node attached to the mobile router to carry out processing of switching default routers (this processing normally requires time) and minimize the effects of disconnection caused by the failure of the link.

This application is based on the Japanese Patent Application No. 2002-378457 filed on Dec. 26, 2002, the entire content of which is expressly incorporated by reference herein.

INDUSTRIAL APPLICABILITY

The mobile network control apparatus and mobile network control method according to the present invention have the effect of improving transmission efficiency without giving any processing loads to nodes of a mobile network and are suitable for use as the mobile network control apparatus having a plurality of connection routes with a global network and a mobile network control method therefor.

What is claimed is:

1. A network control apparatus that maintains a connection between a local network and a global network and that has a plurality of interfaces, the network control apparatus comprising:
   a failure detection section that detects a failure of packet transmission executed using a first interface of the plurality of interfaces, the first interface having a connection route to the global network;
   a search section that searches for a second interface from the plurality of interfaces when the failure is detected;
   an execution section that executes packet transmission using the searched interface instead of the first interface; and
   a multi-homing detection section that detects whether or not the network control apparatus is multi-homed, wherein:
   when the network control apparatus is not multi-horned, the search section searches for an alternative apparatus having the connection route to the global network and belonging to the local network, and determines an ingress interface of the plurality of interfaces as the second interface, the ingress interface having a connection route to the searched alternative apparatus,
   when the network control apparatus is multi-homed, the search section searches for an alternative egress interface having the connection route to the global network from the plurality of interfaces, and determines the alternative egress interface as the second interface, and
   the searched section further comprises a registration section that transmits a registration request of a binding between a global address of the first interface as a permanent address and an address of the second interface as a temporary address in the network control apparatus, from the second interface to a node external to the local network.

2. The network control apparatus according to claim 1, wherein the search section searches for another alternative apparatus when the registration section fails to register the binding.

3. The network control apparatus according to claim 2, wherein when a current address of the second ingress interface is not a global address, the registration section acquires a global address from the searched alternative apparatus and registers a binding between the acquired global address and the address of the first interface.

4. The network control apparatus according to claim 3, wherein the search section searches for another alternative apparatus when the registration section fails to acquire the global address.

5. The network control apparatus according to claim 1, wherein the search section searches for the second interface prior to failure being detected in the first interface in anticipation of such failure occurring.

6. The network control apparatus according to claim 5, wherein the registration section transmits a registration request of a binding between a global address of the first interface as a permanent address and an address of the second interface as a temporary address in the network control apparatus, from the second interface to a node external to the local network, prior to failure being detected in the first interface in anticipation of such failure occurring, when the said external node allows simultaneous usage of the permanent address of the first interface and the temporary address.

7. A network control method in a mobile network control apparatus that maintains a connection between a local network and a global network and that has a plurality of interfaces, the method comprising:
- a failure detection step of detecting a failure of packet transmission executed using a first interface of the plurality of interfaces, the first interface having a connection route to the global network;
- a search step of searching for a second interface from the plurality of interfaces when the failure is detected;
- an execution step of executing packet transmission using the searched interface instead of the first interface; and
- a multi-homing detection step of detecting whether or not the network control apparatus is multi-homed, wherein:
    - when the network control apparatus is not multi-homed, in the search step, an alternative apparatus having the connection route to the global network and belonging to the local network is searched for, and an ingress interface of the plurality of interfaces is determined as the second interface, the ingress interface having a connection route to the searched alternative apparatus,
    - when the mobile network control apparatus is multi-homed, in the search step, an alternative egress interface having the connection route to the global network is searched for from the plurality of interfaces, and the searched alternative egress interface is determined as the second interface, and
    - the searched step further comprises a registration step of transmitting a registration request of a binding between a global address of the first interface as a permanent address and an address of the second interface as a temporary address in the network control apparatus, from the second interface to a node external to the local network.

* * * * *

UNITED STATES PATENT AND TRADEMARK OFFICE
CERTIFICATE OF CORRECTION

| | | |
|---|---|---|
| PATENT NO. | : 7,961,595 B2 | |
| APPLICATION NO. | : 12/490223 | |
| DATED | : June 14, 2011 | |
| INVENTOR(S) | : Chan-Wah Ng et al. | |

It is certified that error appears in the above-identified patent and that said Letters Patent is hereby corrected as shown below:

On the Title Page, issued on June 14, 2011, incorrectly omits Item (30), Foreign Application Priority Data, which should read:

"December 26, 2002 (JP)............... 2002-378457"

Claim 1, column 12, line 23, incorrectly reads:

"when the network control apparatus is not multi-horned,"

and should read:

"when the network control apparatus is not multi-homed,"

Signed and Sealed this
Twenty-eighth Day of February, 2012

David J. Kappos
*Director of the United States Patent and Trademark Office*